Aug. 3, 1943.  W. H. MOSS  2,325,700
COMPOSITE MATERIAL
Filed April 25, 1939
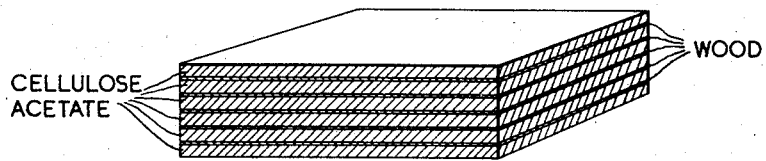
W. H. MOSS
INVENTOR Patented Aug. 3, 1943

2,325,700

UNITED STATES PATENT OFFICE 2,325,700

COMPOSITE MATERIAL

William Henry Moss, London, England, assignor to Celanese Corporation of America, a corporation of Delaware Application April 25, 1939, Serial No. 269,867
In Great Britain May 10, 1938

3 Claims. (Cl. 154—45.9)

This invention relates to composite materials and in particular to a new kind of reinforced thermoplastic material.

The reinforced thermoplastic material of the invention is composed of layers of a thermoplastic composition having a basis of an organic derivative of cellulose, alternating with layers of wood sufficiently thin for the material to be mouldable under heat and pressure.

Preferably, the layers of wood are thinner than the layers of the thermoplastic composition. The layers of wood may, for example, range in thickness from 0.001" to 0.04" and the layers of the thermoplastic composition may, for example, range from twice the thickness of the layer of wood or even more to about one and half times that thickness. The lower the thickness of the wood in proportion to that of the composition, the more easily mouldable is the composite material. The material may be built up of a few layers or of numerous layers, e. g. 20 or 30 to 50 or 60 layers or more according to the thickness required.

The materials of the invention combine the advantages of easy mouldability under heat and pressure with high strength. Their mouldability is greater than that of composite materials made by uniting layers of wood by means of thermosetting synthetic resins and much greater than that of materials made by uniting layers of wood by means of relatively thin layers of a cellulose derivative. The materials of the invention are of special utility in aircraft construction for instance in the production of beams, struts, longérons, air-screws and blades therefor, and of the fuselage and other body portions of aircraft, e. g. the floats of sea-planes. The materials are also useful in boat construction for instance the hulls of small light dinghies can be moulded out of them. They can also be used for panelling in buildings, vehicles, ships and aircraft.

One or both of the outer layers can be of thicker wood than the remainder and these outer layers can be polished, painted or otherwise finished as desired. The composite material can be united to other materials, for instance metal, during or after the formation of the material. Thus for instance, union to a metal plate can be effected simultaneously with the formation of the material by assembling on a metal plate previously coated with nitrocellulose or other substance which facilitates the adhesion to metal of organic derivatives of cellulose, alternate layers of the wood and of the thermoplastic composition in finely divided form and subjecting the assembly to pressure at an elevated temperature, which must of course be below the danger temperature for the nitrocellulose.

The organic derivative of cellulose is preferably cellulose acetate. The thermoplastic composition may contain any suitable plasticiser for the cellulose derivative. Thus for example, the plasticisers that may be used with cellulose acetate include triacetin, dimethyl phthalate, diethyl phthalate, di-(methoxyethyl) phthalate, di-(ethoxyethyl) phthalate, methyl ethoxyethyl phthalate, ethyl ethoxyethyl phthalate, dimethyl tartrate, diethyl tartrate, dibutyl tartrate and p-toluene sulphonamide. Organic phosphates having some plasticising action may also be employed in the composition with a view to increasing its resistance to fire. Among such organic phosphates are tricresyl phosphate, triphenyl phosphate and trichloro butyl phosphate. These substances are best employed in conjunction with plasticisers having a higher affinity for the cellulose derivatives, e. g. triacetin or dimethyl phthalate. Fillers and pigments may be present in the composition if desired.

The thermoplastic composition may also contain non-thermosetting synthetic resins which are compatible with the cellulose derivative, e. g. synthetic resins which are condensation products of formaldehyde with diphenylol propane and other alkylated diphenylol methanes, with sulphonamides such as p-toluene sulphonamide, or with such sulphonamides together with chlorhydrins such as ethylene chlorhydrin and glycerine chlorhydrin.

The composition may be employed in solid, semi-solid or liquid form. Thus, the ingredients of the composition may be applied to the wood in the form of a layer of moulding powder, a sheet of solid or semi-sold composition or a solution, and where a solution is used it may be deposited on the wood by spraying or flowing or in any other desired manner.

Whether or not the composition used comprises a liquid having a solvent or softening action on the cellulose acetate, the union of the assembly by heat and pressure may be effected in the presence of such a liquid which may be a true solvent for cellulose acetate, e. g. acetone, diacetone alcohol, methylene ethylene ether or dioxane or a solvent mixture such as ethylene chloride or methylene chloride with methyl or ethyl alcohol. Alternatively, there may be used a liquid which is not a solvent at ordinary temperatures but develops solvent properties for cellulose acetate when heated, for instance methyl, ethyl or propyl alcohol diluted with water or with a non-aqueous diluent such as benzene, toluene or other liquid hydrocarbon miscible with the alcohol.

One form of product according to the invention is shown by way of example in the accompanying drawing. This shows in perspective a slab of material composed of alternate layers of a thermoplastic composition having a basis of cellulose acetate and of wood, the layers of wood being thinner than the layers of composition.

The following examples illustrate the invention:

Example 1

A moulding powder containing 100 parts of cellulose acetate and 35 parts of triacetin, the parts being by weight (as in all the examples), is ground to pass a sieve of 80 meshes per inch and is spread between layers of wood 0.001"–0.01" thick so that about 10 oz. of the powder is spread on each square yard of wood. In this way an assembly in built up of 20 layers of wood and 19 of the composition (or if it be desired to have the composition on the outer surfaces, of 19 layers of wood and 20 of the composition).

The assembly is then pressed between the polished plattens of a hydraulic press at a temperature between 110 and 130° C. and at a pressure of about 1000 lbs. per square inch until union is effected.

Example 2

The process is carried out as described in Example 1 except that the moulding powder used has the following composition:

| | Parts |
|---|---|
| Cellulose acetate | 250 |
| Diphenylol propane formaldehyde synthetic resin | 200 |
| Triacetin | 150 |

Example 3

Sheets of wood 0.002"–0.005" thick are dipped in a solution of the following composition:

| | Parts |
|---|---|
| Cellulose acetate | 100 |
| Triacetin | 35 |
| Acetone | 400 |

After dipping the sheets are allowed to dry in a warm atmosphere and are then assembled one on top of another and united in a heated press as described in Example 1.

Example 4

The process is carried out as in Example 3 except that the solution has the following composition:

| | Parts |
|---|---|
| Cellulose acetate | 100 |
| Diphenylol propane formaldehyde resin | 80 |
| Triacetin | 60 |
| Acetone | 400 |

Example 5

Preformed sheets 0.015" thick are made by casting the solutions of Example 3 or 4 onto a suitable surface. The sheets are stripped from the surface, assembled between sheets of wood of thickness 0.005"–0.010" and the assembly is united under heat and pressure as described in Example 1.

Example 6

The process is carried out as in Example 5 except that the preformed sheets containing the cellulose derivative are made by consolidating under heat and pressure the powders of Example 1 or 2.

The invention has been described with particular reference to the use as the organic derivative of cellulose of cellulose acetate. Other organic derivatives of cellulose can be used however, a. g.: cellulose propionate, butyrate acetopropionate, acetobutyrate and acetonitrate, and ethyl- or benzyl-cellulose. Moreover, according to a modification of the invention there may be employed instead of an organic derivative of cellulose a non-thermosetting synthetic resin which melts at a temperature below the charring point of wood. Among such synthetic resins are polyvinyl acetate, polyvinyl chloride, polyvinyl ethers, methyl methacrylate and like polymers of unsaturated oxygen-containing compounds.

Having described my invention, what I desire to secure by Letters Patent is:

1. Reinforced thermoplastic material composed of layers of a thermoplastic composition, said composition having a basis of cellulose acetate, alternating with layers of wood of thickness between 0.001 inch and 0.04 inch, the layers of wood being thinner than the layers of thermoplastic composition.

2. Reinforced thermoplastic material composed of layers of a thermoplastic composition, said composition having a basis of cellulose acetate and containing a condensation product of formaldehyde with diphenylol propane, alternating with layers of wood of a thickness between 0.001 inch and 0.04 inch, the layers of wood being thinner than the layers of thermoplastic composition.

3. Reinforced thermoplastic material composed of layers of wood alternating with layers of a thermoplastic composition, the layers of wood being of thickness from 0.001 inch to 0.04 inch, the layers of thermoplastic composition being thicker than the layers of wood, and said composition comprising a substance selected from the class consisting of organic esters of cellulose, ethers of cellulose and thermoplastic synthetic resins, and in addition to said substance a plasticizer therefor.

WILLIAM HENRY MOSS.